United States Patent [19]

Wilner

[11] Patent Number: 4,574,327
[45] Date of Patent: Mar. 4, 1986

[54] CAPACITIVE TRANSDUCER

[75] Inventor: Leslie B. Wilner, Palo Alto, Calif.

[73] Assignee: Becton, Dickinson and Company, Paramus, N.J.

[21] Appl. No.: 611,765

[22] Filed: May 18, 1984

[51] Int. Cl.$^4$ .......................... H01G 7/00; G01L 1/22
[52] U.S. Cl. .......................................... 361/283; 338/4
[58] Field of Search .................... 361/301, 283; 338/4, 338/5; 357/26

[56] References Cited

U.S. PATENT DOCUMENTS

| 4,144,516 | 3/1979 | Aine | 338/4 X |
| 4,236,137 | 11/1980 | Kurtz et al. | 338/4 X |
| 4,287,772 | 9/1981 | Mounteen | 338/4 X |

OTHER PUBLICATIONS

IEEE Transactions on Electron Devices, Jan. 1981, vol. ED-29, No. 1, Lee et al., pp. 42 to 48.
Sensors and Actuators, vol. 4, pp. 191-198, 1983/1984, Rudolf.
Sensors & Systems, 8/1982, Pasadena Zias, pp. 36 to 70.

Primary Examiner—Donald A. Griffin
Attorney, Agent, or Firm—Robert P. Grindle

[57] ABSTRACT

A capacitive transducer is provided having a plate mounted therein to move in a piston-like manner in a sealed cavity toward and away from a fixed cooperating plate forming the other side of the capacitive circuit. The movable plate is etched in a unique fashion from a single crystal silicon wafer in a batch process forming a plurality of capacitive sensors simultaneously. The movable plate is etched in unique fashion with a plurality of spaced passages, allowing passage of fluid such as air contained in the cavity therethrough, thus damping plate movement by such fluids. The surfaces of the plate are further etched with special grooves to direct fluid flow to the passages. Moreover, a plurality of spaced stops are included in the plate surface during the etching process to overcome both electrostatic latch-up, wherein electrical attraction exceeds membrane restoring force, and pneumatic latch-up, wherein membrane restoring force is inadequate to draw gas between plates in close proximity.

12 Claims, 9 Drawing Figures

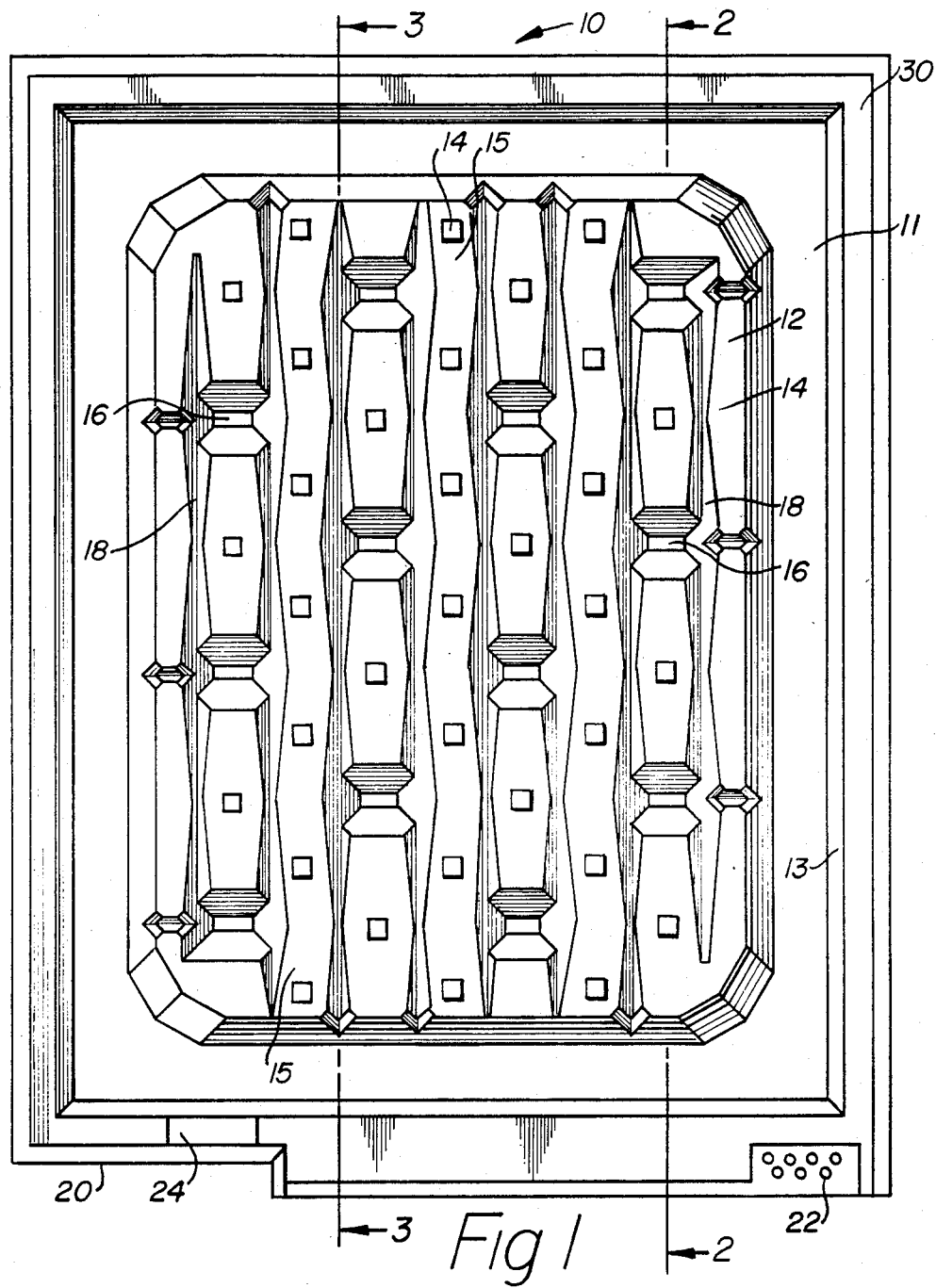

CAPACITIVE TRANSDUCER

BACKGROUND AND STATEMENT OF THE INVENTION

This invention relates to a batch-fabricated silicon capacitive accelerometer. More particularly, this invention relates to such a capacitive transducer which utilizes a sandwich-type structure wherein a movable plate is mounted to move in a piston-like fashion in a cavity toward and away from a fixed plate to provide an exceptionally large area of movement of the movable plate in its movements toward and away from the fixed plate. That is, the entire area of the movable plate moves toward and away from the fixed plate, rather than in a flexing type pattern of movement usually provided with capacitive transducers of this type.

With the use of computers allowing increasingly complex instrumentation systems, there is a pressing need for individual sensors of high reliability and modest cost. Included in this need is a need for acceleration sensors, both to measure acceleration directly and to allow integration of acceleration and time to measure velocity and displacement. This is particularly true, as mentioned above, in manufacturing processes utilizing robot structures for the production of such items as automobiles. It is also important in propulsion systems for aircraft, for example, or projectiles of various kinds used in the armed services. It is important that such structures be extremely small, but still operate, as will be appreciated by practitioners-in-the-art, under extreme conditions of temperature and pressure vibration and shock and that they operate in an extremely sensitive fashion to applied stimuli over a very wide range.

The use of a rigid central "piston" moving on a flexure within a frame has already been developed. For example, such a structure is taught and claimed in U.S. Pat. No. 4,236,137. In that arrangement, the means for detecting motion is strain gages on the flexures on which the central plate flexes. By contrast, with this invention, the flexure is approximately in the center of the thickness of the plate. The central flexure is important because it prevents tilting of the central mass in response to accelerations in the plane of the plate during the sensing process. This is brought about in the process of the invention by controlling closely the depth of an etch. That is, the bottom of an etched cavity is modified, then released by another etch to form the flexible membrane, upon which the "piston-like" plate moves. With the device described in U.S. Pat. No. 4,236,137, gas damping has used the plane space between the plates of changing proximity with squeeze-film damping between the plates which is extremely dependent upon the proximity of the plates and is limited in its frequency range by the velocity of sound of the medium.

With this invention by contrast, a uniquely devised plate is produced utilizing a plurality of spaced apart holes or passages for movement of fluid therethrough. Thus, the fluid moves through the passages as the plate moves back and forth in its piston-like fashion. More importantly, special grooves are developed on the surfaces of the plate which have the effect of precisely directing the flow of fluid toward and away from the passages, thus guiding the fluid movement during movement of the piston-like movable plate. The principle gas flow resistance is in the spreading channels on the face of the plate. For this reason, damping in the perforations or holes in the plate avoids these problems.

Another feature of the invention here is the use of spots of glass as stops over the surface of the movable plate. In an overload, therefore, the stops prevent electrical shorting of the plates. The spots, in addition, prevent two forms of latch-up in an overload. In very sensitive capacitive sensors, the attractive force of the electrical bias or carrier will exceed the spring force of the membrane mounting the movable piston at some proximity in the movement of the piston-like plate toward the fixed plate. Therefore, the plates latch together. The height of the stop spots, in accordance with this invention, is chosen to prevent latch-up. For example, in one embodiment of the invention, the height is chosen to prevent latch-up at 5 volts with a restoring stiffness allowing for one micro inch travel in response to 1G acceleration.

Another latch-up problem can take the form of pneumatic latch-up. That is, as flat plates are brought very close into proximity with each other, the flow resistance into the space between them becomes very high. It may take a long time (several seconds) for gas to re-enter this space in a sensitive capacitive sensor, and allow the moving plate to return to its normal position after an overload. The stop spots of the invention spaced over the surface of the plate keep the space open between the two plates to allow gas flow and rapid recovery.

As stated above, one of the features of the invention here is the mounting of the movable plate in a sandwich structure wherein a cavity is formed between the two outer layers with a central layer or core being the structure mounting the movable capacitor plate, and with the core portion or layer also forming part of the cavity on the plate surface on either side. Thus, the formed cavity has communication on either side of the movable plate through the perforations formed in the plate.

An additional feature of the invention is the use of small silicon knobs, ridges, bars or other protuberances on the core which are jammed into an aluminum film on an opposing part of the sandwich, which has the effect that the knobs are held in contact by elastic deformation of the underlying material which makes for a stable connection between the parts. Finally, in the processing of the capacitor plate of the invention, highly sensitive capacitive sensors of very small size are produced, in accordance herewith, with uniform thin flexures by means of a diffused etch stop.

In considering generally the conditions for producing a silicon capacitive sensor in accordance with this invention, it is important to realize that the resulting instrument must provide a capacitor gap which is controllable within ±10%, and the residual membrane thickness must be controllable within ±8%. Also, the residual membrane must be substantially at the mid plane of the wafer. Furthermore, the width of the channels on the face must be controllable within ±15% of minimum dimension and have predictable rounding at channel exits, while there must be, of course, the throughholes. In addition, the throughholes and channels must not have fragile overhanging material. The stop spots must be insulated to withstand anodic bonding voltages, and be within 0.6 and 1.0 microns in thickness. Finally, the bonding rims must be flat and smooth for anodic bonding, and no photolithography is allowed after the membranes are revealed or developed.

As purely illustrative of a process for achieving the desired results, and particularly in the production of the central movable plate structure of the sandwich structure of the invention, the starting material is a single crystal silicon wafer N or P type (100) plane indexed [110] within 0.7°. The initial thickness is selected to be 0.0075 inches ±0.0002 inches. Both sides are polished and then oxidized lightly to about 0.3 microns thickness. Thereafter photolithograph matched index patterns are applied to the front and back oxide coats and the open index spots are reoxidized. Then, photolithographic patterns of its grooves, channels and throughholes are opened in the oxide on the front surface, and throughholes in the oxide on the back surfaces. The wafer is then etched in a potassium hydroxide etch slightly more than halfway through (0.0039 inches) to open the throughholes. Subsequently, the front surface is photolithographed, removing the remaining oxide from the central movable portion, leaving the rims in tact. Thereafter, using a precise shallow etch (i.e., ion beam milling) 3.5 microns ±10% are removed from the exposed silicon of the front surface, thus forming the capacitor gap.

Following this, all remaining oxide is stripped, and both sides reoxidized with a heavy oxide layer to thickness of about 0.6 microns. The back surface is photolithographed to leave oxide only over areas to be attacked in final etch, and remove all other oxide. All exposed silicon is then doped with boron to the extent wherein for a depth of 2.2 microns the boron concentration is in excess of $5 \times 10^{19}$ atom/cc.

In a dry $O_2$ environment, the wafer is reoxidized to reduce to 1.6 microns the net depth in which boron exceeds $5 \times 10^{19}$ atoms/cc. The layer of high doping will taper, in this situation, into lower doping both inward and outward. The oxide should be about 0.6 microns. Photolithography is then applied to leave stop spots of oxide on the face, followed by removal of all other oxide. Finally, the final etchant is applied (ethylene diamine/ pyrocatechol [EDP] etchant) to reveal residual membranes of silicon doped more than $5 \times 10^{19}$ atom/cc.

In forming the lid and base of the sandwich structure of the invention, one procedure is to provide the lid and base of Pyrex. In this connection, a borosilicate glass is used and preferably Pyrex. The requirements for the glass are that it must have a thermal expansion close to silicon, so that during cooling, after bonding of the two surfaces together, contraction is closely related to silicon. Moreover, the glass should have an electrical conductivity, at the bonding temperature of 450°–550° C., of between $10^5$ and $10^8$ ohm Cm. Finally, the glass should have mechanical and chemical stability at temperatures below 100° C. The base plate carries the stationary plate of the capacitor. This may be a thin metallic film opposite the moving plate, with an extension through a notch in the rim of the central part, for electrical connection. This notch may be sealed with solder-glass to assure cleanliness of the interior of the device. The lid must have a recess opposite the moving portion of the central part to allow motion. These two Pyrex parts can be anodically bonded to the central part.

Alternatively, the lid and base may be principally silicon, with inlays of Pyrex or equivalent to provide insulating, low capacitance bonds between layers. One procedure for making such composites of Pyrex and silicon is to etch into the silicon, recesses slightly deeper than the desired thickness of Pyrex inlay. Pyrex frit is then deposited on the silicon by sedimentation, and fused to form a solid layer of glass with a thickness greater than the depth recesses.

The surface of the wafer is then ground and polished to remove the Pyrex from the undisturbed surface of the silicon to produce a flat, smooth surface on the Pyrex in the recesses. The base, which is the fixed plate of the capacitor, is coated with a thin aluminum film, which is patterned photolithographically to provide convenient connections, both to the base and the central layer with the movable plate. The lid requires a recess to permit motion of the moving plate. Such recess is conveniently made by etching in the EDP etchant, which attacks the silicon but not the Pyrex.

There are two objects in using silicon outside layers with Pyrex inlays. One is to go out-of-plane with the fixed electrode to remove the need for a notch in the bonding rim and the need then to plug that notch. The other is to reduce the dissimilarity of thermal expansion among the parts by making them more nearly all one material.

With the foregoing and additional objects in view, this invention will now be described in more detail and other objects and advantages hereof will be apparent from the following description, the accompanying drawings, and the appended claims.

DESCRIPTION OF THE DRAWINGS

FIG. 1 is a bottom plan view of the capacitor plate of the invention which forms the central portion of the sandwich structure providing the capacitive transducer of the invention;

FIG. 8 is a plan view of the base portion of the sandwich structure of the invention showing the internal upper surface of the base, which faces the central core plate portion of the invention; and.

DETAILED DESCRIPTION OF THE INVENTION

Figure 3:
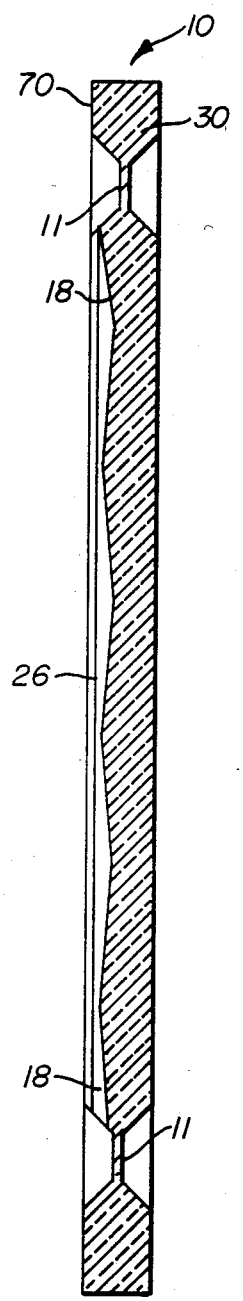
FIG. 3 is a sectional view taken along lines 3—3 of FIG. 1.

Referring to the drawings in which like reference characters refer to like parts throughout the several views thereof, FIG. 1 shows a plan view of the central capacitor plate or core of the invention which plate is placed between the base portion and the lid portion to form a sandwich structure for use as an ultrasensitive capacitive transducer. In fact, the plan view shown of the central capacitor plate is the bottom surface thereof which faces the base section as described above. Thus, capacitor plate 10 includes the central movable plate portion 15, movable in piston-like manner in directions normal to the plane of the paper on which FIG. 1 is shown with the movement thereof being along flexible membrane 11. As can be seen in FIG. 1, the outer surface of membrane 11 is connected to binding rim 30.

One feature of the invention herein and as described above, is a plurality of perforations or passages 16 formed in spaced fashion over the surface of movable plate 15. These perforations or passages allow the movement of air in the sandwich structure of the capacitive transducer of the invention, from the bottom surface of plate 15 to the top surface thereof and visa versa. Recess 12 subdivided by groove 18 are in the face surface of the capacitor core 10 in the movable plate portion 15 thereof to form a portion of the lower cavity formed between the base portion of the sandwich structure of the invention to be described below, and the central capacitor plate 10. Moreover, the surface recesses and/or grooves form guiding surfaces for air flow damping to guide the air along the surface towards the perforations 16. This serves to provide rapid precisely directed air flow to provide rapid recovery when the opposing plates move close to each other. As a further feature of the invention as discussed above, electrical contact protuberances or bumps 22 are provided on the bottom surface of plate 22 to provide contact with an opposing thin metal film on the opposing base facing surface when the various parts forming the sandwich structure of the capacitive transducer of the invention are joined together. 24 is a recess through core plate 10 so that a metal film contact of the fixed plate can pass through.

As an additional feature of the invention herein, during the formation of the core plate portion 10 of the invention, a plurality of stops 14 are formed in spaced apart fashion over the surface of the central piston-like movable plate portion 15. Thus, the stops 14 are dielectric and serve to prevent electrical contact of the plate 15 with the opposing central surface of the central fixed base of the sandwich structure of the invention. This, in turn, prevents pneumatic latch-up so that air may flow rapidly in between the plates.

Figure 2:
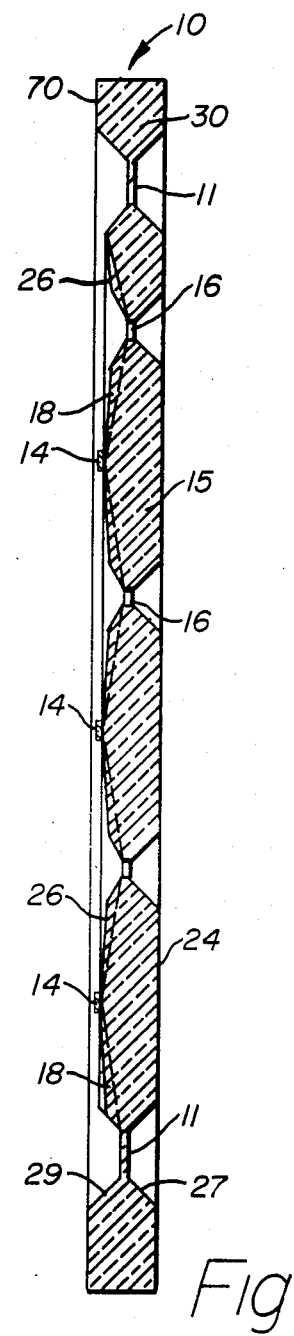
FIG. 2 is a sectional view taken along lines 2—2 of FIG. 1.

Referring now to FIG. 2, this view is of a section through the central plate portion 10 of the invention. As can be seen in FIG. 2, surface 26 is etched below the actual rim surface 70 of plate 10. Etched to a lesser depth are the series of stops 14, to provide the engaging surfaces of the flexible piston-like plate 15 in its movement toward the opposed fixed capacitor plate formed in the base portion of the sandwich structure of the invention. Shown in dotted line fashion in surface 26 of plate 10 are the configuration of the air flow damping grooves 18. "Ramps" 27, 29 extend from the surfaces 24, 26, respectively to form the membrane 11 upon which plate 15 is suspended for its movement.

It should be understood here that the dimensions of etching depths are extremely small in the devices being produced. Thus, the etching depth of the surfaces of stops 14 and surface 26 below surface 70 would not be visible to the naked eye in the showings of FIG. 2. The showings are extremely exaggerated, as well as others in this discussion, for the purposes of clarity. The overall size of the capacitor described is discussed below.

Referring now to FIG. 3, this section shows the same capacitor face surface 26 with damping grooves 18. This sectional view is through an area not having any perforations.

Figure 7:
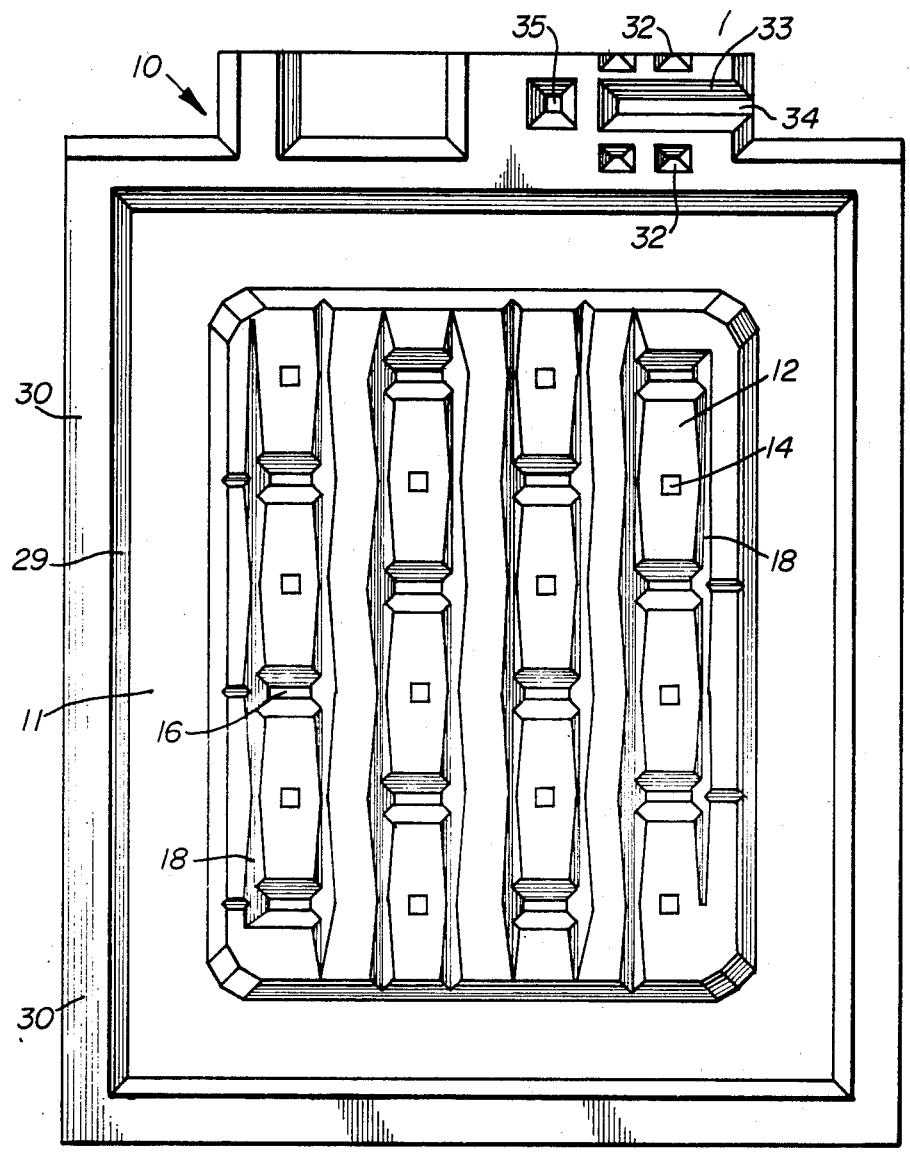
FIG. 7 is a bottom plan view similar to FIG. 1 of the central core or capacitor plate portion of the sandwich structure of the invention, with the base layer removed therefrom.
Figure 8:
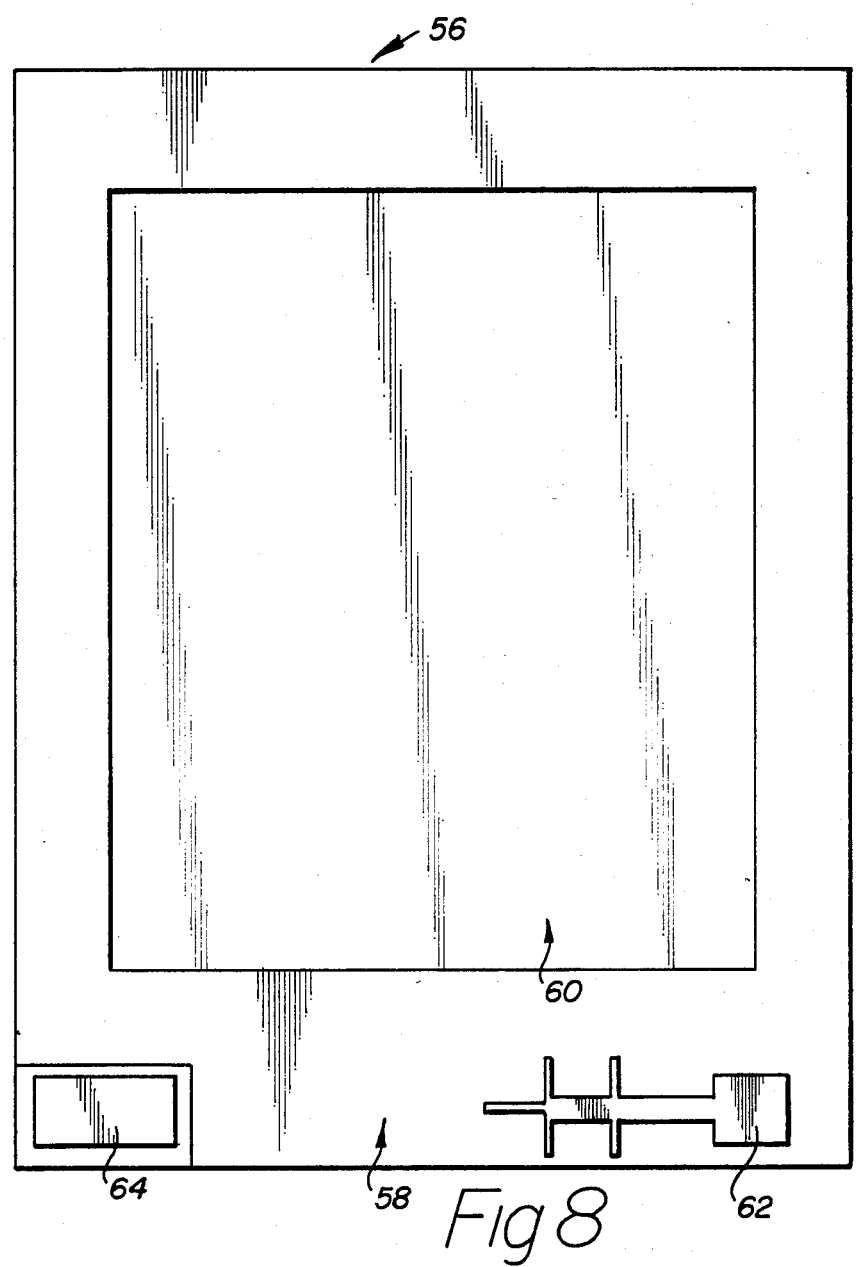
Figure 9:
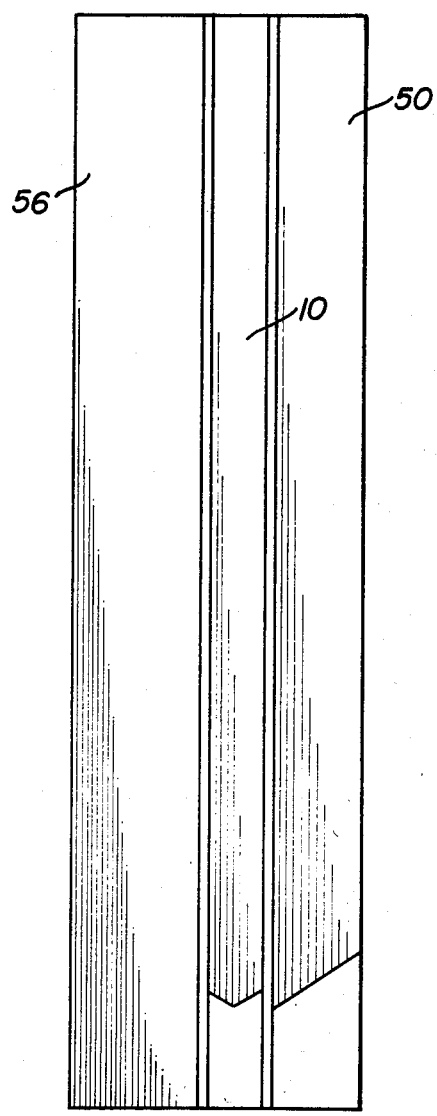
FIG. 9 is a side elevational view of the capacitive transducer sandwich structure of the invention.

FIGS. 5-9 show the sandwich structure of the capacitive transducer of the invention. For example, FIG. 9 shows the joined together sections including base 56, core 10 and lid or top 50.

Figure 4:
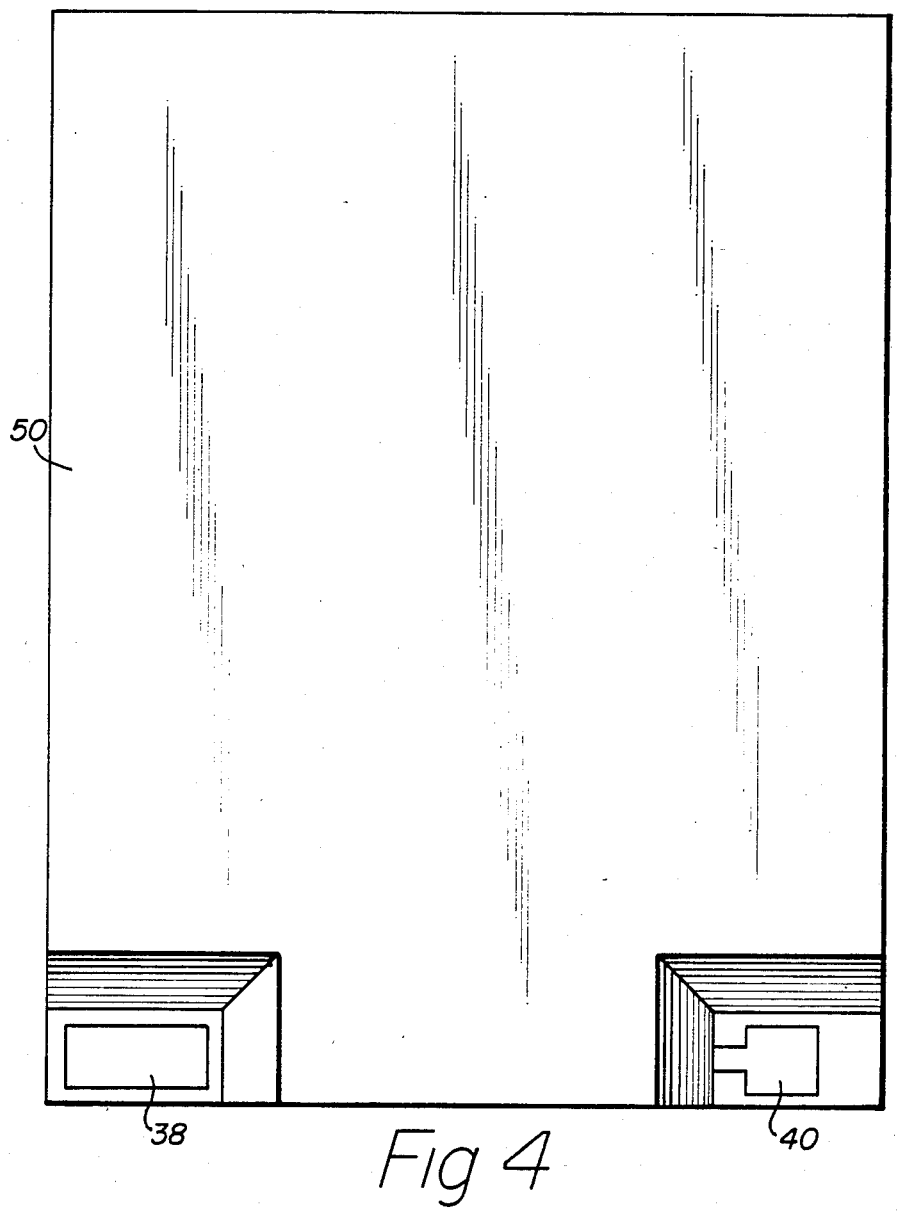
FIG. 4 is a top plan view of the capacitive transducer of the invention showing the top surface of the sandwich structure thereof.
Figure 5:
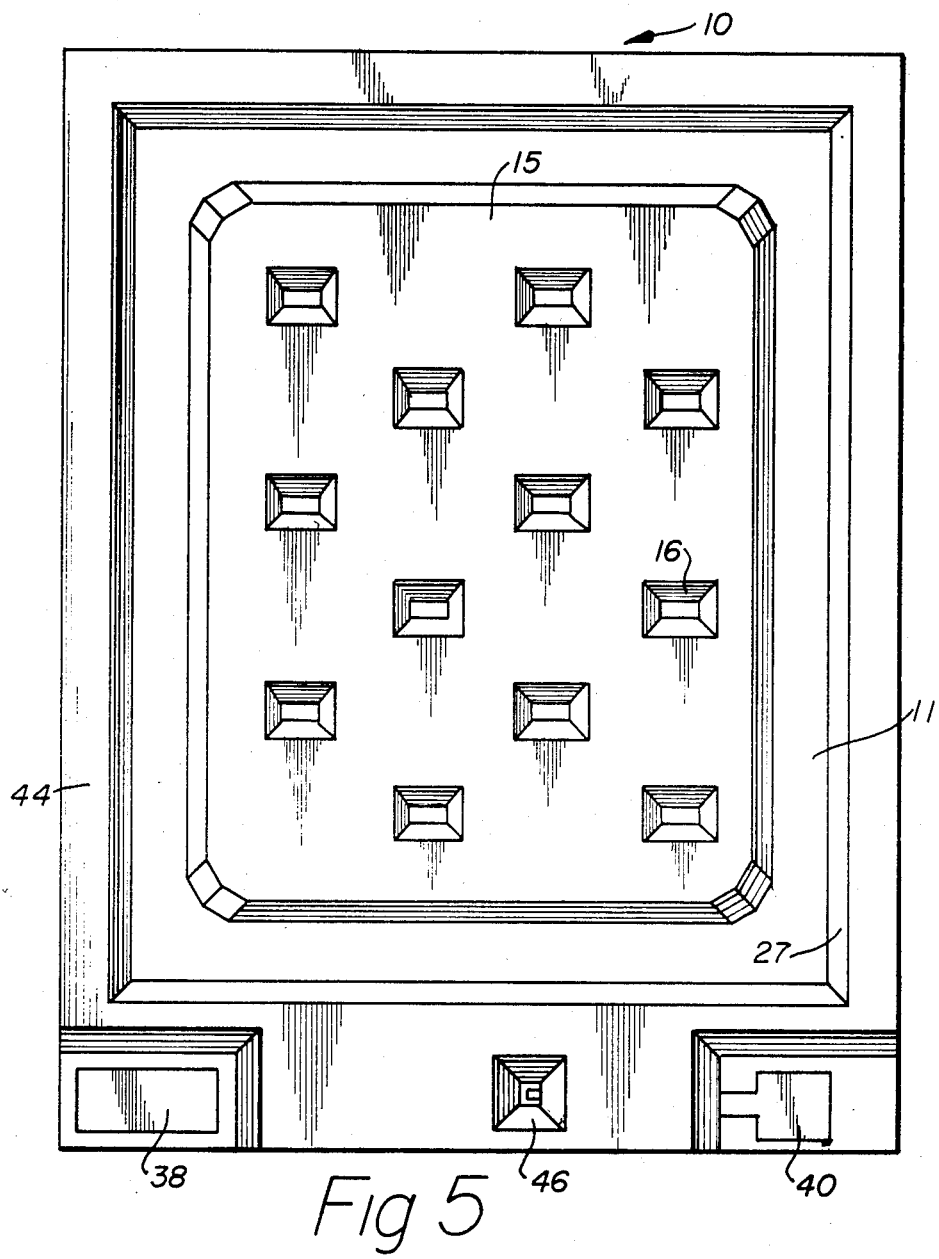
FIG. 5 is a top plan view of the core or capacitor plate of the invention with the lid or top portion of the sandwich structure removed.
Figure 6:
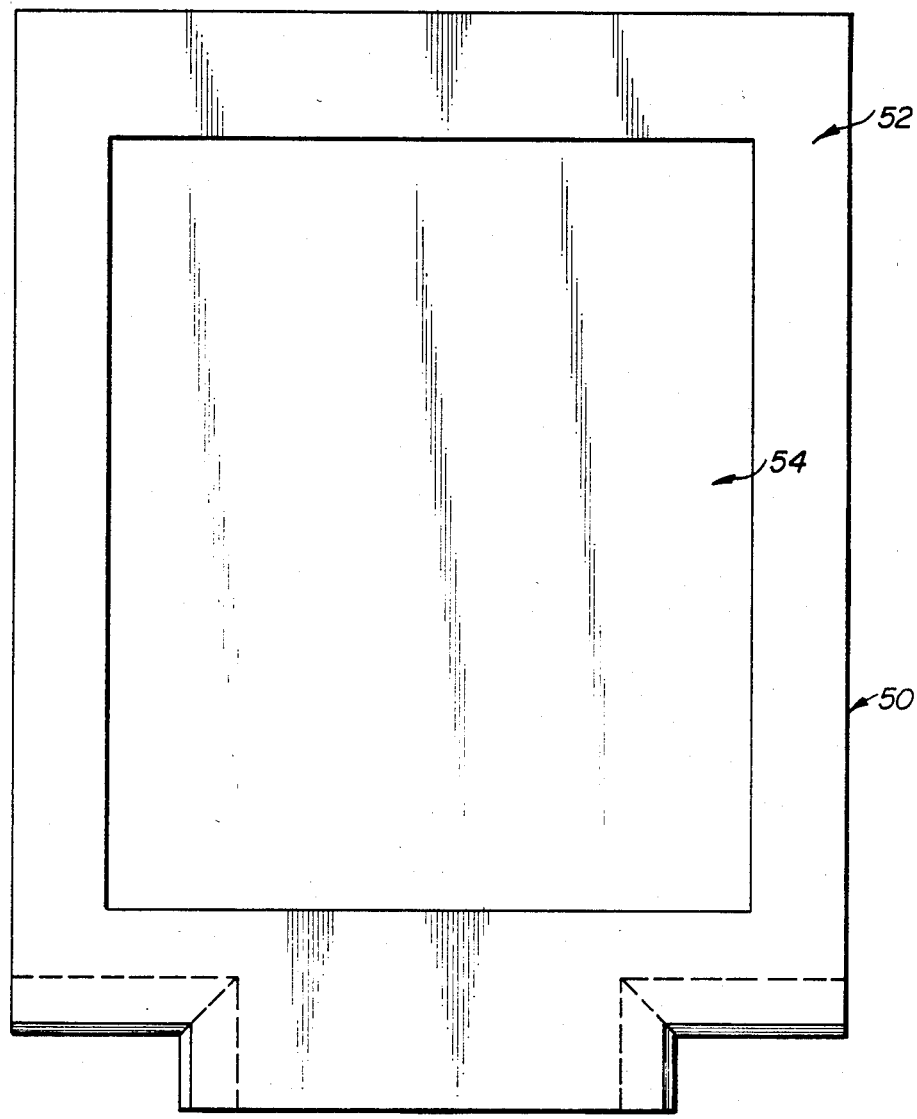
FIG. 6 is a plan view of the bottom surface of the lid of the sandwich structure of the invention removed from the core capacitor plate portion thereof.

FIG. 4 shows the top plan view of the sandwich structure of the invention including the outer surface of lid 50 together with the base contact 38 and the core contact 40. When the lid portion 50 is removed from the top face of the central core portion 10, the exposed inner surface of lid 50 looks as shown in FIG. 6. That is, a rim portion, in the form of a Pyrex film 52, extends around the outer surface of the silicon crystal forming the lid. In this connection, a representative thickness of the Pyrex film formed from fritted Pyrex granules as discussed above, is about 0.0004 inches in its polished and/or lapped form. The central portion 54 is bare silicon etched back from the engaging surface of the lid 0.00035 inches. Thus, this etched back bare silicon surface has the effect of forming a portion of the cavity of the sandwich structure of the invention. When the lid 50 is removed from the upper surface of the central core 10, the appearance of the top surface of the central core is as shown in FIG. 5. As can be seen in FIG. 5, a plurality of holes or perforations 16 are formed in the top surface of the core portion 10 in the movable plate section 15 thereof, which is movable on membrane 11.

Referring now to FIG. 8, when the base 56 is removed from the central core portion, the facing surface of base 56 looks as shown in FIG. 8. In this case, base 56 also includes a Pyrex film rim 58 formed in the same manner as the Pyrex film rim formed in the lid portion of the sandwich structure of the invention. Contact 62 is a metal-Pyrex contact to plate 10 and is isolated from contact with base 56, while contact 64 is a metal/silicon contact for base 56. The bare silicon portion 60, which forms a fixed capacitor plate, and is etched back 0.00012 inches, as representative of a specific dimension. The etch backed portion, again, forms a portion of the cavity in which plate 15 flexes in the sandwich structure of the invention.

FIG. 7 is similar to the showing of FIG. 1 and shows the bottom plan surface of the central core portion 10 with appropriate recesses 32, 34 and 35, forming a plurality of spaced apart silicon ridges or bars which contact area 62 on base 58. Narrow bars 33 are formed between isolated pits 32 and 35 to contact 62 shown in FIG. 8. Pit 35 extends clear through core 10 into pit 46 (FIG. 5) affording a view of metal contact 62 for visual alignment. The various contacts serve to connect the apparatus of the invention to appropriate circuitry for reading the change in capacitance produced by a change in measured acceleration or pressure.

The capacitive transducer of the invention is extremely small, as discussed above briefly. As purely illustrative of dimensions which may be used in producing the sandwich-type capacitive transducer of the invention, the thickness of the sandwich structure may be, for example, 0.0575 inches. Assuming this dimension for the thickness, the width may be 0.106 inches and the length 0.137 inches.

Thus, as will be understood from the foregoing, there is provided in accordance with this invention, a silicon capacitive transducer or accelerometer fabricated with silicon wafer technology wherein the seismic mass, its elastic support, the frame to which the support is attached, and the means to employ gas damping are etched from a single silicon crystal. The capacitor gap may be also etched into the same silicon part and companion parts provide the second capacitor plate, which may also be comprised of silicon crystal. The arrangement herein provides an accelerometer which is very stable because its principle components are each of one continuous single crystal. It is economical to produce despite the requirements for high precision, and the complexity of gas damping, because a large number of identical devices may be made simultaneously in wafer form.

Moreover, the structure herein is particularly important in that it provides for central flexure of a plate moving in piston-like manner so as to prevent tilting of the central mass in response to accelerations which would have the effect of incorrect signals. The sensor of the invention is gas damped with its principle gas flow resistance being in the spreading channels formed on the face of the plate. Thus, damping in the perforations avoids the problems of the prior art even though it involves a significant mass of moving gas. The arrangement herein, utilizing the stops formed on the surface of the device, together with the air flow control prevents two forms of latch-up. That is, voltage overloading of the soft spring membrane supporting the moving capacitor plate is avoided by a selection of the thickness of the stop spots. Morever, pneumatic latch-up is prevented since the stop spots keep the space open between the opposing capacitor plates and allow for gas flow into that area and rapid recovery.

While the methods and the products produced by the methods herein disclosed form preferred embodiments of this invention, this invention is not limited to those specific methods and products and changes can be made therein without departing from the scope of this invention which is defined in the appended claims. For example, the process and products developed from the process forming the invention herein may be modified for providing silicon pressure transducers, as will be apparent from the clear teachings of this specification.

Further, as will be understood by practitioners-in-the-art, the number of openings 16 can be varied, depending upon the specific application of the device, with consequential variation in the size and number of grooves 18. Moreover, instead of using a single spring membrane 11, two partial spring membranes may be formed, one at either surface of the central core 10.

It will be understood, in addition, that a symmetrical system may be formed according to this invention wherein the second outer plate becomes a third capacitive element. With this arrangement, grooves and stops are formed on both surfaces of the seismic mass or plate. The gaps formed on either side of the plate are substantially equal.

In relation to this arrangement, a pressure transducer may be formed utilizing the second outer layer as a force summing area, mechanically in contact with the seismic mass. Under these circumstances, the force summing area applies deflection forces to the mass in proportion to applied pressure.

What is claimed is:

1. A plate for use as the movable capacitor plate in a capacitive sensing apparatus, characterized by
   (a) said plate comprised of monocrystalline silicon;
   (b) a rim forming the periphery of said plate;
   (c) a central seismic mass on said plate, and spaced on each side edge from said rim;
   (d) a membrane spring surrounding said seismic mass and forming the connection thereof on all sides to said rim;
   (e) said seismic mass being supported on said membrane for movement in a plane normal to the plane of said plate, when mounted in a capacitive sensing apparatus;
   (f) at least one hole formed in said seismic mass for forming fluid communication between each side of said mass when mounted in a capacitive sensing apparatus;
   (g) a plurality of grooves formed in one face of said plate;
   (h) said grooves extending in said face from said hole to a point spaced from said hole;
   (i) said grooves being of gradually decreasing cross section in direct relationship to the distance away from said hole; and
   (j) electrical contact means on said plate for transmitting the measured stimuli of said plate when mounted in a capacitive sensing apparatus.

2. The plate of claim 1, further characterized by
   (a) a plurality of spaced apart dielectric projections extending from said one face of said seismic mass; and
   (b) said projections for engaging an opposing surface when said plate is mounted for movement in a capacitive sensing apparatus.

3. The plate of claim 1, further characterized by
   (a) a plurality of said holes spaced over said seismic mass; and
   (b) a plurality of said grooves extending from each of said holes.

4. Capacitive sensing apparatus, characterized by
   (a) a laminate comprised of three layers, an inner plate layer, a first outer layer and a second outer layer of substantially the same size;
   (b) each of said three layers comprised of monocrystalline silicon;
   (c) each of said first and second outer layers insulated from said inner plate layer;
   (d) a rim forming the periphery of said inner plate;
   (e) each of said outer layers joined and sealed at the periphery thereof to one side of said plate rim;
   (f) a central seismic mass on said plate forming the movable capacitive plate of said apparatus and having a first and a second face, and said mass spaced on each side edge from said rim;
   (g) a membrane spring surrounding said seismic mass at each side edge thereof and forming the connection thereof to said rim;
   (h) said seismic mass being supported on said membrane for movement in a plane normal to the plane of said plate;
   (i) at least one hole formed in said seismic mass for forming fluid communication between said first and second face of said mass;
   (j) a plurality of grooves formed in the first face of said seismic mass;
   (k) said grooves extending in said face from said hole to a point spaced from said hole;
   (l) said grooves being of gradually decreasing cross section in direct relationship to the distance away from said hole;
   (m) said first outer layer forming the fixed plate of said capacitive sensing apparatus;
   (n) said second outer layer enclosing said seismic mass and limiting the movement thereof away from said first outer layer;
   (o) said outer layers and said rim forming a cavity for containing a gas therein; and (p) cooperating electrical contact means on said plate and at least one of said outer layers for transmitting the measured stimuli of said apparatus.

5. The apparatus of claim 4, further characterized by
(a) a plurality of spaced apart dielectric projections extending from said first face; and
(b) said projections for engaging said first outer layer.

6. Apparatus of claim 4, further characterized by
(a) a plurality of said holes spaced over said seismic mass, and
(b) a plurality of said grooves extending from each of said holes in said first face.

7. Apparatus of claim 4, further characterized by said cooperating electrical contact means comprising
(a) a plurality of metallic projections on said inner plate layer; and
(b) a deformable metallic sheet for engaging said metallic projections in positive electrical contact.

8. The apparatus of claim 4, further characterized by
(a) said insulating periphery of each of said outer layers joined to the rim of said inner plate is comprised of an inlay of borosilicate glass.

9. Capacitive sensing apparatus characterized by
(a) a laminate comprised of three layers, an inner plate layer, a first outer layer and a second outer layer of substantially the same size;
(b) said inner plate layer comprised of monocrystalline silicon, and said outer layers comprised of a borosilicate glass having expansion properties substantially the same as silicon;
(c) a rim forming the periphery of said inner plate layer, said rim having on both side surfaces thereof a borosilicate glass film bonded to said opposed first and second outer layers to bond and insulate said inner plate layer relative to said first and second outer layers;
(d) a metallic film on said first outer layer, said metallic film forming the fixed capacitor plate of said apparatus;
(e) a central seismic mass on said plate forming the movable capacitive plate of said apparatus and having a first and a second face, and said mass spaced on each side edge from said rim;
(f) a membrane spring surrounding said seismic mass at each side edge thereof and forming the connection thereof to said rim;
(g) said seismic mass being supported on said membrane for movement in a plane normal to the plane of said plate;
(h) at least one hole formed in said seismic mass for forming fluid communication between said first and second face of said mass;
(i) a plurality of grooves formed in the first face of said seismic mass;
(j) said grooves extending in said face from said hole to a point spaced from said hole;
(k) said grooves being of gradually decreasing cross section in direct relationship to the distance away from said hole;
(l) said second outer layer enclosing said seismic mass and limiting the movement thereof away from said first outer layer;
(m) said outer layers and said rim forming a cavity for containing a gas therein; and
(n) cooperating electrical contact means on said plate and at least one of said outer layers for transmitting the measured stimuli of said apparatus.

10. Apparatus of claim 9, further characterized by
(a) a plurality of spaced apart dielectric projections extending from said first face of said seismic mass; and
(b) said projections for engaging said first outer layer.

11. Apparatus of claim 9, further characterized by
(a) a plurality of said holes spaced over said seismic mass; and
(b) a plurality of said grooves extending from each of said holes in said first face.

12. Apparatus of claim 9, further characterized by said cooperating electrical contact means comprising
(a) a plurality of metallic projections on said inner plate layer; and
(b) a deformable metallic sheet for engaging said metallic projections in positive electrical contact.

* * * * *